United States Patent
Xie et al.

(10) Patent No.: US 10,019,123 B2
(45) Date of Patent: Jul. 10, 2018

(54) TOUCH SUBSTRATE, TOUCH DISPLAY PANEL AND TOUCH DISPLAY APPARATUS HAVING THE SAME, AND FABRICATING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Xiaodong Xie, Beijing (CN); Ming Hu, Beijing (CN); Ming Zhang, Beijing (CN); Zouming Xu, Beijing (CN)

(73) Assignees: BOE TECHNOLOGY GROUP CO., LTD., Beijing (CN); HEFEI ZINGSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 34 days.

(21) Appl. No.: 15/508,626

(22) PCT Filed: Nov. 15, 2016

(86) PCT No.: PCT/CN2016/105877
§ 371 (c)(1),
(2) Date: Mar. 3, 2017

(87) PCT Pub. No.: WO2017/088685
PCT Pub. Date: Jun. 1, 2017

(65) Prior Publication Data
US 2017/0285806 A1 Oct. 5, 2017

(30) Foreign Application Priority Data
Nov. 24, 2015 (CN) .......................... 2015 1 0824573

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ....................................................... G06F 3/044
See application file for complete search history.

(56) References Cited

U.S. PATENT DOCUMENTS

| 8,847,093 B2 * | 9/2014 | Xie | G06F 3/044 200/600 |
| 9,158,407 B2 * | 10/2015 | Coulson | G06F 3/044 |

(Continued)

FOREIGN PATENT DOCUMENTS

| CN | 104407759 A | 3/2015 |
| CN | 104571711 A | 4/2015 |
| CN | 205121523 U | 3/2016 |

OTHER PUBLICATIONS

International Search Report & Written Opinion dated Dec. 28, 2016 regarding PCT/CN2016/105877.

(Continued)

*Primary Examiner* — Chad Dicke
(74) *Attorney, Agent, or Firm* — Intellectual Valley Law, P.C.

(57) ABSTRACT

The present application discloses a touch substrate including a first touch electrode layer having a plurality of rows of first touch electrodes; each of the plurality of rows including a plurality of first electrode segments spaced apart from each other and a plurality of second electrode segments spaced apart from each other; and a second touch electrode layer having a plurality of columns of second touch electrodes; each of the plurality of columns including a plurality of third electrode segments spaced apart from each other and a plurality of fourth electrode segments spaced apart from each other.

17 Claims, 9 Drawing Sheets

(56) References Cited

U.S. PATENT DOCUMENTS

| | | | | |
|---|---|---|---|---|
| 9,164,636 B2* | 10/2015 | Kuo | ............... | G06F 3/0412 |
| 2010/0149116 A1* | 6/2010 | Yang | ............... | G06F 3/0416 |
| | | | | 345/173 |
| 2010/0302201 A1* | 12/2010 | Ritter | ............... | G06F 3/044 |
| | | | | 345/174 |
| 2011/0005818 A1* | 1/2011 | Lee | ............... | G06F 3/044 |
| | | | | 174/258 |
| 2013/0098749 A1* | 4/2013 | Xie | ............... | G06F 3/044 |
| | | | | 200/600 |
| 2013/0257785 A1* | 10/2013 | Brown | ............... | G06F 3/044 |
| | | | | 345/174 |
| 2014/0168540 A1* | 6/2014 | Wang | ............... | G06F 3/0412 |
| | | | | 349/12 |
| 2014/0211102 A1 | 7/2014 | Kang et al. | | |
| 2014/0346027 A1* | 11/2014 | Li | ............... | G06F 3/044 |
| | | | | 200/600 |
| 2015/0029423 A1* | 1/2015 | Huang | ............... | G06F 3/047 |
| | | | | 349/12 |
| 2015/0035794 A1* | 2/2015 | Zhitomirskiy | ...... | G06F 3/0416 |
| | | | | 345/174 |
| 2015/0261370 A1* | 9/2015 | Yoo | ............... | G06F 3/0412 |
| | | | | 345/173 |
| 2015/0324036 A1* | 11/2015 | Schwartz | ......... | G06F 3/0416 |
| | | | | 345/174 |
| 2016/0085371 A1* | 3/2016 | Wang | ............... | H03K 17/9622 |
| | | | | 345/174 |
| 2016/0162072 A1 | 6/2016 | Xie et al. | | |
| 2016/0342230 A1 | 11/2016 | Xie et al. | | |
| 2017/0255310 A1* | 9/2017 | Miyamoto | ........ | G06F 3/0412 |

OTHER PUBLICATIONS

First Office Action in the Chinese Patent Application No. 201510824573.0, dated Sep. 21, 2017; English translation attached.

* cited by examiner

10,019,123 B2

TOUCH SUBSTRATE, TOUCH DISPLAY PANEL AND TOUCH DISPLAY APPARATUS HAVING THE SAME, AND FABRICATING METHOD THEREOF

CROSS-REFERENCE TO RELATED APPLICATION

This application is a national stage application under 35 U.S.C. § 371 of International Application No. PCT/CN2016/105877, filed Nov. 15, 2016, which claims priority to Chinese Patent Application No. 201510824573.0, filed Nov. 24, 2015, the contents of which are incorporated by reference in the entirety.

TECHNICAL FIELD

The present invention relates to a touch substrate, a touch display panel and a touch display apparatus having the same, and a fabricating method thereof.

BACKGROUND

Conventional touch control display panels typically use indium tin oxide as the touch electrode material. Indium tin oxide is a rare earth metal element and is expensive. Also, indium tin oxide has a relatively high resistance, which leads to a relative large RC delay in a conventional touch panel having indium tin oxide as the touch electrode material. Due to the large resistance of indium tin oxide material, a large size touch display panel requires an indium tin oxide touch electrode having a relatively large thickness. The relatively large thickness results in a lower light transmission in the display panel. High display quality, large-size touch display panels having a touch electrode made of alternative materials such as metals have become a focus of research and development.

SUMMARY

In one aspect, the present invention provides a touch substrate comprising a first touch electrode layer comprising a plurality of rows of first touch electrodes; each of the plurality of rows comprising a plurality of first electrode segments spaced apart from each other and a plurality of second electrode segments spaced apart from each other; and a second touch electrode layer comprising a plurality of columns of second touch electrodes; each of the plurality of columns comprising a plurality of third electrode segments spaced apart from each other and a plurality of fourth electrode segments spaced apart from each other; wherein one of the first electrode segment and the second electrode segment is a non-metal transparent electrode segment and the other one of the first electrode segment and the second electrode segment is a metal electrode segment; and one of the third electrode segment and the fourth electrode segment is a non-metal transparent electrode segment and the other one of the third electrode segment and the fourth electrode segment is a metal electrode segment.

Optionally, adjacent first electrode segments along a row direction are electrically connected through a second electrode segment; adjacent second electrode segments along a row direction are electrically connected through a first electrode segment; adjacent third electrode segments along a column direction are electrically connected through a fourth electrode segment; and adjacent fourth electrode segments along a column direction are electrically connected through a third electrode segment.

Optionally, the plurality of first electrode segments correspond to the plurality of third electrode segments; each of the plurality of first electrode segments crossing over a third electrode segment forming a first intersection; the plurality of second electrode segments correspond to the plurality of fourth electrode segments; each of the plurality of second electrode segments crossing over a fourth electrode segment forming a second intersection.

Optionally, the plurality of first electrode segments and the plurality of third electrode segments are metal electrode segments; and the plurality of second electrode segments and the plurality of fourth electrode segments are non-metal transparent electrode segments.

Optionally, the plurality of first electrode segments and the plurality of fourth electrode segments are metal electrode segments; and the plurality of second electrode segments and the plurality of third electrode segments are non-metal transparent electrode segments.

Optionally, one or both of the first electrode segment and the third electrode segment comprises a closed ring-shaped electrode portion; and the plurality of first electrode segments and the plurality of third electrode segments are metal electrode segments; and the plurality of second electrode segments and the plurality of fourth electrode segments are non-metal transparent electrode segments.

Optionally, both the first electrode segment and the third electrode segment comprise a closed ring-shaped electrode portion; and projections on the touch substrate of closed ring-shaped electrode portions of a pair of first electrode segment and third electrode segment that cross over each other are partially non-overlapping.

Optionally, the first electrode segment and the fourth electrode segment comprise a closed ring-shaped electrode portion; and the plurality of first electrode segments and the plurality of fourth electrode segments are metal electrode segments; and the plurality of second electrode segments and the plurality of third electrode segments are non-metal transparent electrode segments.

Optionally, the second electrode segment and the third electrode comprise a closed ring-shaped electrode portion.

Optionally, one or both of the second electrode segment and the fourth electrode segment comprises a closed ring-shaped electrode portion; and the plurality of first electrode segments and the plurality of third electrode segments are metal electrode segments; and the plurality of second electrode segments and the plurality of fourth electrode segments are non-metal transparent electrode segments.

Optionally, both the second electrode segment and the fourth electrode segment comprise a closed ring-shaped electrode portion; and projections on the touch substrate of closed ring-shaped electrode portions of a pair of second electrode segment and fourth electrode segment that cross over each other are partially non-overlapping.

Optionally, the touch substrate comprises a bases substrate; the first touch electrode layer on the base substrate; an insulating layer on a side of the first touch electrode layer distal to the base substrate; and the second touch electrode layer.

Optionally, the metal electrode segment is a metal electrode segment.

Optionally, the non-metal transparent electrode segment is an electrode segment made of a transparent metal oxide.

In another aspect, the present invention provides a method of fabricating a touch substrate, comprising forming a first touch electrode layer comprising a plurality of rows of first touch electrodes; each of the plurality of rows being formed to comprise a plurality of first electrode segments spaced apart from each other and a plurality of second electrode segments spaced apart from each other; and forming a second touch electrode layer comprising a plurality of columns of second touch electrodes; each of the plurality of columns being formed to comprise a plurality of third electrode segments spaced apart from each other and a plurality of fourth electrode segments spaced apart from each other; wherein one of the first electrode segment and the second electrode segment is a non-metal transparent electrode segment and the other one of the first electrode segment and the second electrode segment is a metal electrode segment; and one of the third electrode segment and the fourth electrode segment is a non-metal transparent electrode segment and the other one of the third electrode segment and the fourth electrode segment is a metal electrode segment.

Optionally, the step of forming the first touch electrode layer comprises forming a metal electrode material layer on a base substrate; patterning the metal electrode material layer to form a plurality of rows of metal electrode segments; and forming a non-metal transparent electrode material layer on the base substrate; patterning the non-metal transparent electrode material layer to form a plurality of rows of non-metal transparent electrode segments; wherein adjacent metal electrode segments along a row direction are electrically connected through a non-metal transparent electrode segment; adjacent non-metal transparent electrode segments along a row direction are electrically connected through a metal electrode segment.

Optionally, the method further comprises forming an insulating layer on a side of the first touch electrode layer distal to the base substrate; and forming the second touch electrode layer on a side of the insulating layer distal to the first touch electrode layer; wherein the step of forming the second touch electrode layer comprises forming a metal electrode material layer on the insulating layer; patterning the metal electrode material layer to form a plurality of columns of metal electrode segments; and forming a non-metal transparent electrode material layer on the insulating layer; patterning the non-metal transparent electrode material layer to form a plurality of columns of non-metal transparent electrode segments; wherein adjacent metal electrode segments along a column direction are electrically connected through a non-metal transparent electrode segment; adjacent non-metal transparent electrode segments along a column direction are electrically connected through a metal electrode segment In another aspect, the present invention provides a touch panel comprising a touch substrate described herein or fabricated by a method described herein.

In another aspect, the present invention provides a touch panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
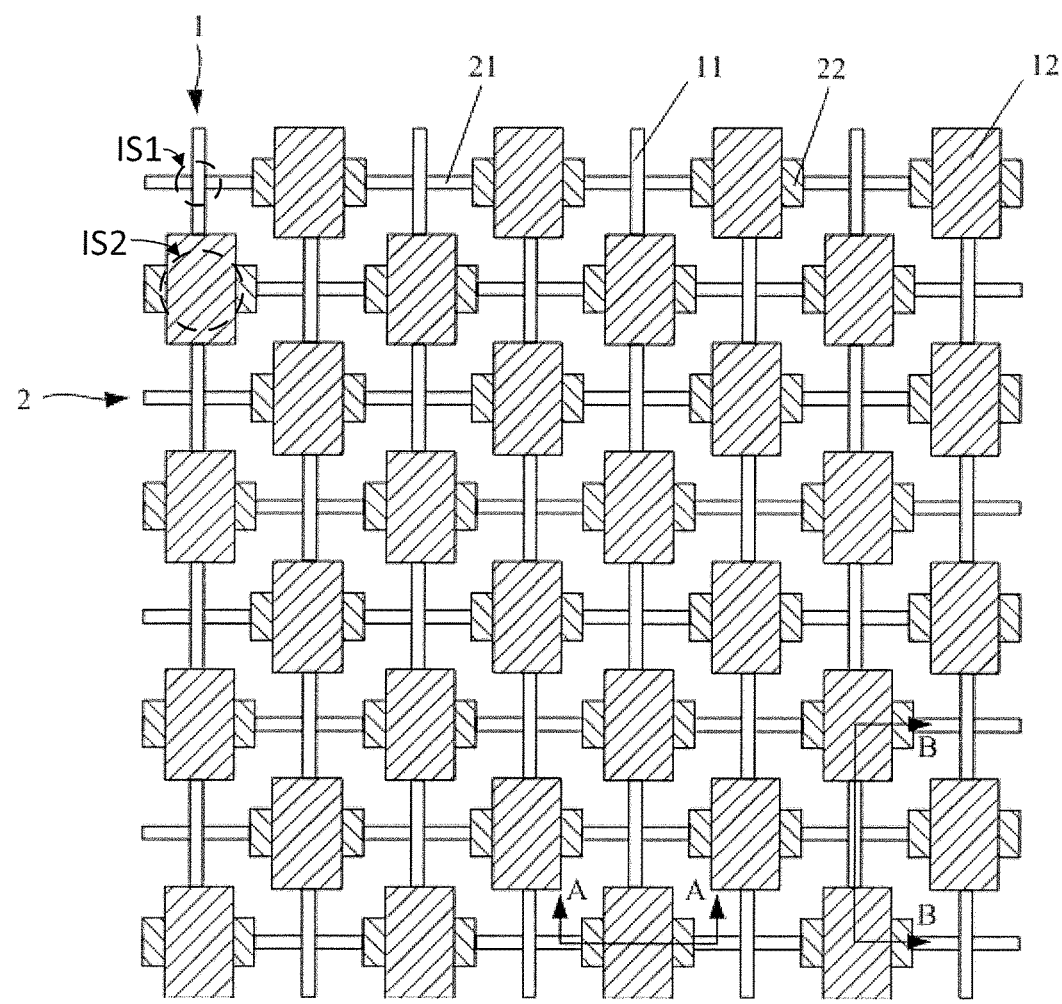
FIG. 1 is a diagram illustrating the structure of a touch substrate in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional metal electrode touch panels, Moiré pattern and anti-blanking effect occur frequently due to the presence of the metal lines in the touch panel, affecting display quality in the conventional metal electrode touch panels. To reduce Moiré pattern and to increase blacking effect, a width of the metal electrode lines has to be decreased. However, a metal line having a reduced line width are prone to problems such as metal line open and poor anti-electrostatic ability. An irregular metal line pattern may be used to further reduced Moiré pattern, however, it does not alleviate the anti-blanking effect in the touch panel.

Accordingly, the present invention provides, inter alia, a touch substrate, a display panel and a display apparatus having the same, and a fabricating method thereof that substantially obviate one or more of the problems due to limitations and disadvantages of the related art. In one aspect, the present disclosure provides a touch substrate. In some embodiments, the touch substrate includes a first touch electrode layer including a plurality of rows of first touch electrodes; a second touch electrode layer including a plurality of columns of second touch electrodes. Each of the plurality of rows includes a plurality of first electrode segments spaced apart from each other and a plurality of second electrode segments spaced apart from each other. Each of the plurality of columns comprises a plurality of third electrode segments spaced apart from each other and a plurality of fourth electrode segments spaced apart from each other. In some embodiments, adjacent first electrode segments along a row direction are electrically connected through a second electrode segment; and adjacent second electrode segments along a row direction are electrically connected through a first electrode segment. In some embodiments, adjacent third electrode segments along a column direction are electrically connected through a fourth electrode segment; and adjacent fourth electrode segments along a column direction are electrically connected through a third electrode segment.

In some embodiments of the present touch substrate, one of the first electrode segment and the second electrode segment is a non-metal transparent electrode segment and the other one of the first electrode segment and the second electrode segment is a metal electrode segment; and one of the third electrode segment and the fourth electrode segment is a non-metal transparent electrode segment and the other one of the third electrode segment and the fourth electrode segment is a metal electrode segment. Optionally, the plurality of first electrode segments and the plurality of third electrode segments are metal electrode segments; and the plurality of second electrode segments and the plurality of fourth electrode segments are non-metal transparent electrode segments. Optionally, the plurality of first electrode segments and the plurality of fourth electrode segments are metal electrode segments; and the plurality of second electrode segments and the plurality of third electrode segments are non-metal transparent electrode segments.

Optionally, the metal electrode segments are made of a metal material. Optionally, the metal electrode segments are made of a graphene electrode material. Examples of appropriate metal electrode materials include, but are not limited to, copper, aluminum, silver, molybdenum, chromium, neodymium, nickel, manganese, titanium, tantalum, and tungsten.

Optionally, the non-metal transparent electrode segments are made of a transparent metal oxide electrode material. Optionally, the non-metal transparent electrode segments are made of a transparent nano-carbon tubes material. Examples of transparent metal oxide materials include, but are not limited to, indium tin oxide, indium zinc oxide, indium gallium oxide, and indium gallium zinc oxide.

In the present touch substrate, the first touch electrode layer and the second touch electrode layer include a combination of metal electrode segments (e.g., metal electrode segments) and non-metal transparent electrode segments (e.g., transparent metal oxide electrode segments). Thus, the present touch substrate has a lower distribution density of metal electrodes. Moreover, the metal electrode segments in the present touch substrate are arranged in an irregular metal pattern, effectively preventing the occurrence of Moiré pattern in the touch panel. Further, the inclusion of non-metal transparent electrode segments enhances overall light transmittance of the touch panel, achieving an excellent blanking effect. These advantages obviate the need of reducing the metal line width to reduce the Moiré pattern and enhance the blanking effect in the conventional touch panel. Accordingly, the metal electrode line in the present touch substrate may be made to have a relative large width, resulting in a lower touch electrode resistance and a higher signal transmittance rate. As a result, touch detection sensitivity is greatly improved in a touch panel having the present touch substrate.

Figure 2:
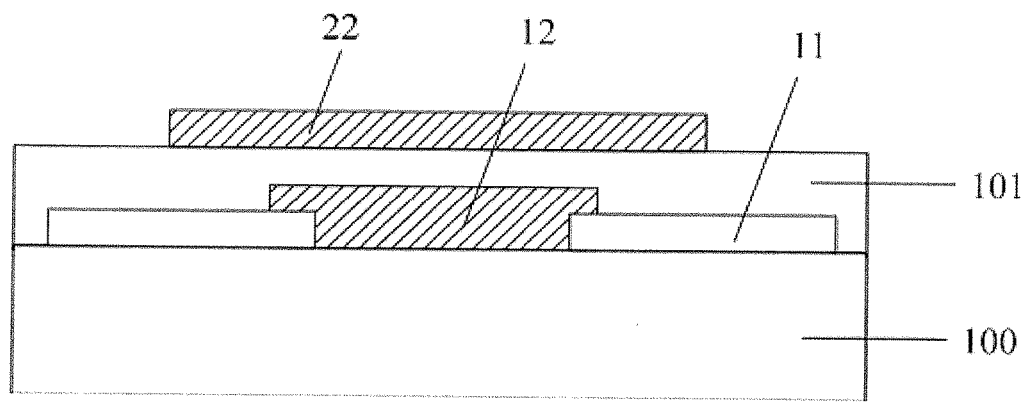
FIG. 2 shows a cross-sectional view along the A-A' direction of the touch substrate in FIG. 1.
Figure 3:
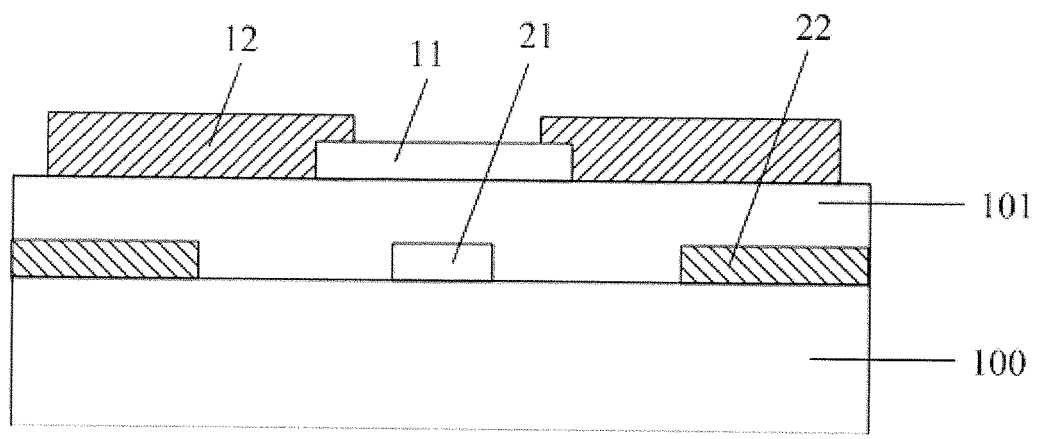
FIG. 3 shows a cross-sectional view along the B-B' direction of the touch substrate in FIG. 1.

FIG. 1 is a diagram illustrating the structure of a touch substrate in some embodiments according to the present disclosure. FIG. 2 shows a cross-sectional view along the A-A' direction of the touch substrate in FIG. 1. FIG. 3 shows a cross-sectional view along the B-B' direction of the touch substrate in FIG. 1. Referring to FIG. 1, the touch substrate in the embodiment includes a first touch electrode layer including a plurality of rows of first touch electrodes 2, and a second touch electrode layer including a plurality of columns of second touch electrode 1. The first touch electrode layer and the second touch electrode layer are disposed on a base substrate. The plurality of rows of first touch electrodes 2 and the plurality of columns of second touch electrode 1 cross over each other, forming a plurality of intersections corresponding to a plurality of touch detection nodes. For example, an intersection may correspond to a region in which projections of a first touch electrode 2 and a second touch electrode 1 on the base substrate overlap with each other. As shown in FIG. 2 and FIG. 3, the touch substrate further includes in insulating layer 101 between the first touch electrode layer and the second touch electrode layer. A row of first touch electrodes 2 and a column of second touch electrodes 1 form touch panel capacitor around a touch detection node corresponding to an intersection. When a finger touches a point on the touch control display panel, the capacitor of the finger superimposes on the touch panel capacitor, resulting in a change in the capacitance of the touch panel capacitor. Based on the capacitance change upon a touch event, the coordinates of the first electrode and the second electrode being touched may be determined.

Referring to FIG. 1, each first touch electrode 2 includes a first touch electrode segment 21 and a second touch electrode segment 22. Each row of first touch electrodes 2 includes a plurality of first electrode segments 21 spaced apart from each other and a plurality of second electrode segments 22 spaced apart from each other. Adjacent first electrode segments 21 along a row direction are electrically connected through a second electrode segment 22. Adjacent second electrode segments 22 along a row direction are electrically connected through a first electrode segment 21. Similarly, each second touch electrode 1 includes a third touch electrode segment 11 and a fourth touch electrode segment 12. Each column of second touch electrode 1 includes a plurality of third electrode segments 11 spaced apart from each other and a plurality of fourth electrode segments 12 spaced apart from each other. Adjacent third electrode segments 11 along a column direction are electrically connected through a fourth electrode segment 12. Adjacent fourth electrode segments 12 along a column direction are electrically connected through a third electrode segment 11.

In FIG. 1, the first touch electrode segment 21 is a metal electrode segment, the second touch electrode segment 22 is a non-metal transparent electrode segment, the third touch electrode segment 11 is a metal electrode segment, and the fourth touch electrode segment 12 is a non-metal transparent electrode segment. Optionally, the first touch electrode segment 21 is a non-metal transparent electrode segment, and the second touch electrode segment 22 is a metal electrode segment. Optionally, the third touch electrode segment 11 is a non-metal transparent electrode segment, and the fourth touch electrode segment 12 is a metal electrode segment. Optionally, the first touch electrode segment 21 is a non-metal transparent electrode segment, the second touch electrode segment 22 is a metal electrode segment, the third touch electrode segment 11 is a non-metal transparent electrode segment, and the fourth touch electrode segment 12 is a metal electrode segment. Optionally, the first touch electrode segment 21 is a metal electrode segment, the second touch electrode segment 22 is a non-metal transparent electrode segment, the third touch electrode segment 11 is a non-metal transparent electrode segment, and the fourth touch electrode segment 12 is a metal electrode segment. In some embodiments, one of the first electrode segment 21 and the second electrode segment 22 is a non-metal transparent electrode segment and the other one of the first electrode segment 21 and the second electrode segment 22 is a metal electrode segment; and one of the third electrode segment 11 and the fourth electrode segment 12 is a non-metal transparent electrode segment and the other one of the third electrode segment 11 and the fourth electrode segment 12 is a metal electrode segment.

In some embodiments, each row of first touch electrodes includes a plurality of metal electrode segments (e.g., metal electrode segments) spaced apart from each other and a plurality of non-metal transparent electrode segments (e.g., transparent metal oxide electrode segments) spaced apart from each other. Adjacent metal electrode segments along a row direction are electrically connected through a non-metal transparent electrode segment, and adjacent non-metal transparent electrode segments along the row direction are electrically connected through a metal electrode segment. In some embodiments, each column of second touch electrode includes a plurality of metal electrode segments (e.g., metal electrode segments) spaced apart from each other and a plurality of non-metal transparent electrode segments (e.g., transparent metal oxide electrode segments) spaced apart from each other. Adjacent metal electrode segments along a column direction are electrically connected through a non-metal transparent electrode segment, and adjacent non-metal transparent electrode segments along the column direction are electrically connected through a metal electrode segment.

Referring to FIG. 1, optionally, the plurality of first electrode segments 21 and the plurality of second electrode segments 22 are on a same horizontal plane; and the plurality of third electrode segments 11 and the plurality of fourth electrode segments 12 are on a same horizontal plane. Optionally, the first touch electrode layer and the second touch electrode layer are in different layers.

Figure 4:
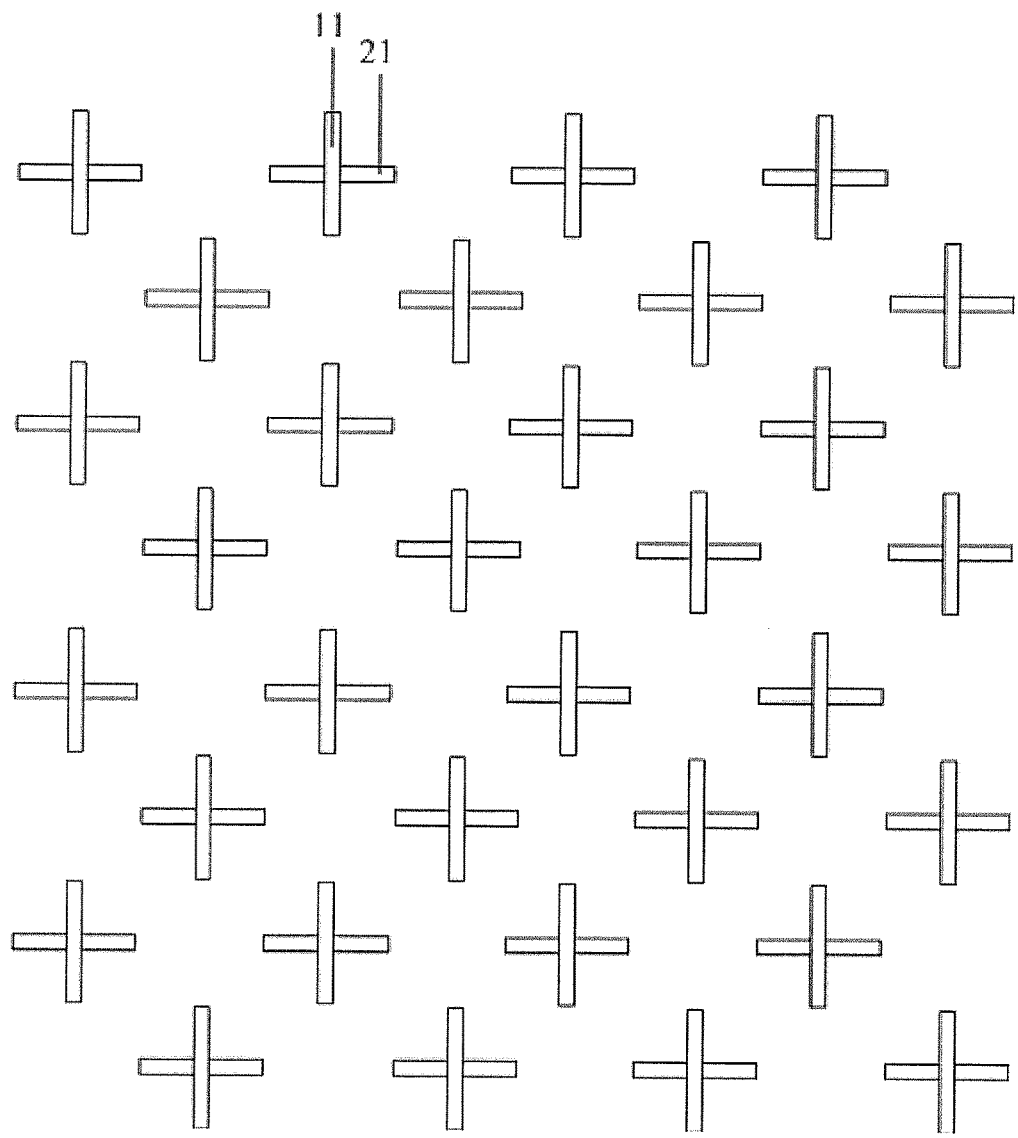
FIG. 4 is a diagram illustrating the structure of the metal electrode segments in the first touch electrode layer and the second touch electrode layer in some embodiments according to the present disclosure.

Referring to FIG. 1 and FIG. 4, the plurality of first electrode segments 21 correspond to the plurality of third electrode segments 11, i.e., each of the plurality of first electrode segments 21 crossing over a third electrode segment 11 forming a first intersection IS1. Referring to FIG. 1 and FIG. 3, the plurality of second electrode segments 12 correspond to the plurality of fourth electrode segments 22, i.e., each of the plurality of second electrode segments 12 crossing over a fourth electrode segment 22 forming a second intersection IS2.

Optionally, the plurality of first electrode segments 21 correspond to the plurality of third electrode segments 11 in a one-to-one relationship, and the plurality of second electrode segments 12 correspond to the plurality of fourth electrode segments 22 in a one-to-one relationship. As shown in FIG. 3 and FIG. 4, projections of each pair of corresponding first electrode segment 21 and third electrode segment 11 on the base substrate partially overlap with each other, and projections of each pair of corresponding second electrode segment 12 and fourth electrode segment 22 on the base substrate partially overlap with each other.

Optionally, as shown in FIG. 1, a plurality of metal electrode segments in the first touch electrode layer 2 correspond to a plurality of metal electrode segments in the second touch electrode layer 1. Each of the plurality of metal electrode segments in the first touch electrode layer 2 crosses over a metal electrode segment in the second touch electrode layer 1. Optionally, a plurality of non-metal transparent electrode segments in the first touch electrode layer 2 correspond to a plurality of non-metal transparent electrode segments in the second touch electrode layer 1. Each of the plurality of non-metal transparent electrode segments in the first touch electrode layer 2 crosses over a non-metal transparent electrode segment in the second touch electrode layer 1.

Optionally, the plurality of metal electrode segments in the first touch electrode layer correspond to the plurality of metal electrode segments in the second touch electrode layer in a one-to-one relationship, and the plurality of non-metal transparent electrode segments in the first touch electrode layer correspond to the plurality of non-metal transparent electrode segments in the second touch electrode layer in a one-to-one relationship. Optionally, projections of each pair of corresponding metal electrode segments on the base substrate partially overlap with each other, and projections of each pair of corresponding non-metal transparent electrode segments on the base substrate partially overlap with each other.

Optionally, the plurality of metal electrode segments in the first touch electrode layer correspond to the plurality of non-metal transparent electrode segments in the second touch electrode layer, e.g., in a one-to-one relationship; and he plurality of non-metal transparent electrode segments in the first touch electrode layer correspond to the plurality of metal electrode segments in the second touch electrode layer, e.g., in a one-to-one relationship. Optionally, projections of each pair of corresponding metal electrode segment in the first touch electrode layer and non-metal transparent electrode segment in the second touch electrode layer on the base substrate partially overlap with each other, and projections of each pair of corresponding non-metal transparent electrode segment in the first touch electrode layer and metal electrode segment in the second touch electrode layer on the base substrate partially overlap with each other.

Optionally, the plurality of first touch electrodes are a plurality of touch scanning electrodes, and the plurality of second touch electrode are a plurality of touch sensing electrodes. Optionally, the plurality of first touch electrodes are a plurality of touch sensing electrodes, and the plurality of second touch electrode are a plurality of touch scanning electrodes.

FIG. 4 is a diagram illustrating the structure of the metal electrode segments in the first touch electrode layer and the second touch electrode layer in some embodiments according to the present disclosure. Referring to FIG. 4, the plurality of metal electrode segments 21 in the first touch electrode layer cross over the plurality of metal electrode segments 11 in the second touch electrode layer, forming an irregular metal electrode pattern. The irregular metal pattern in the touch substrate prevents the occurrence of Moiré pattern due to the presence of the metal lines in the touch panel. Accordingly, the metal electrode line in the present touch substrate may be made to have a relative large width, resulting in a lower touch electrode resistance and a higher signal transmittance rate. Moreover, the inclusion of non-metal transparent electrode segments enhances overall light transmittance of the touch panel, achieving an excellent blanking effect.

Referring to FIG. 2 and FIG. 3, the third electrode segment 11 (e.g., a metal electrode segment) and the fourth electrode segment 12 (e.g., a transparent metal oxide electrode segment) are directly electrically connected to each other. The fourth electrode segment 12 may be directly electrically connected to the third electrode segment 11 through an overlapping joint (as shown in FIG. 2). For example, a portion of the fourth electrode segment 12 overlaps with a portion of the third electrode segment 11, thereby electrically connecting the two electrode segments. Similarly, the first electrode segment 21 (e.g., a metal electrode segment) and the second electrode segment 22 (e.g., a transparent metal oxide electrode segment) are directly electrically connected to each other. Optionally, the second electrode segment 22 may be directly electrically connected to the first electrode segment 21 through an overlapping joint.

In FIG. 1, the plurality of metal electrode segments 21 in the first touch electrode layer 2 correspond to the plurality of metal electrode segments 11 in the second touch electrode layer 1 in a one-to-one relationship, and projections of each pair of corresponding metal electrode segments on the base substrate partially overlap with each other; the plurality of non-metal transparent electrode segments 22 in the first touch electrode layer 2 correspond to the plurality of non-metal transparent electrode segments 12 in the second touch electrode layer 1 in a one-to-one relationship, and projections of each pair of corresponding non-metal transparent electrode segments on the base substrate partially overlap with each other. The areas corresponding to the overlapping pairs of non-metal transparent electrode segments have a high light transmittance rate, achieving an excellent blanking effect in the touch panel.

During a touch event, e.g., when a finger touches a point on the touch control display panel, a fringe capacitance between the first touch electrode and the second touch electrode changes. By increasing the fringe capacitance between first touch electrode and the second touch electrode, touch detection sensitivity may be greatly enhanced. Accordingly, in some embodiments, one or more of the electrode segments may be designed to have a shape that increases the fringe capacitance between the first touch electrode and the second touch electrode. For example, one or more of the electrode segments may include a closed ring-shaped electrode portion (e.g., an electrode segment having an opening in a central portion thereof). Optionally, the metal electrode segments in one or both touch electrode layers include a closed ring-shaped electrode portion. Optionally, the non-metal transparent electrode segments in one or both touch electrode layers include a closed ring-shaped electrode portion. Optionally, the metal electrode segments in both touch electrode layers include a closed ring-shaped electrode portion. Optionally, the non-metal transparent electrode segments in both touch electrode layers include a closed ring-shaped electrode portion. Optionally, the metal electrode segments in one layer and the non-metal transparent electrode segments in another layer include a closed ring-shaped electrode portion. Optionally, all electrode segments in both touch electrode layers include a closed ring-shaped electrode portion. The ring-shaped electrode portion may have various types of ring structures. Optionally, the ring structure may be essentially a square shape with an opening in a central portion thereof. Optionally, the ring structure may be essentially a rectangular shape with an opening in a central portion thereof. Optionally, the ring structure may be forming of other shapes (e.g., a triangle, a circle, or another shape) with an opening in a central portion thereof.

Figure 5:
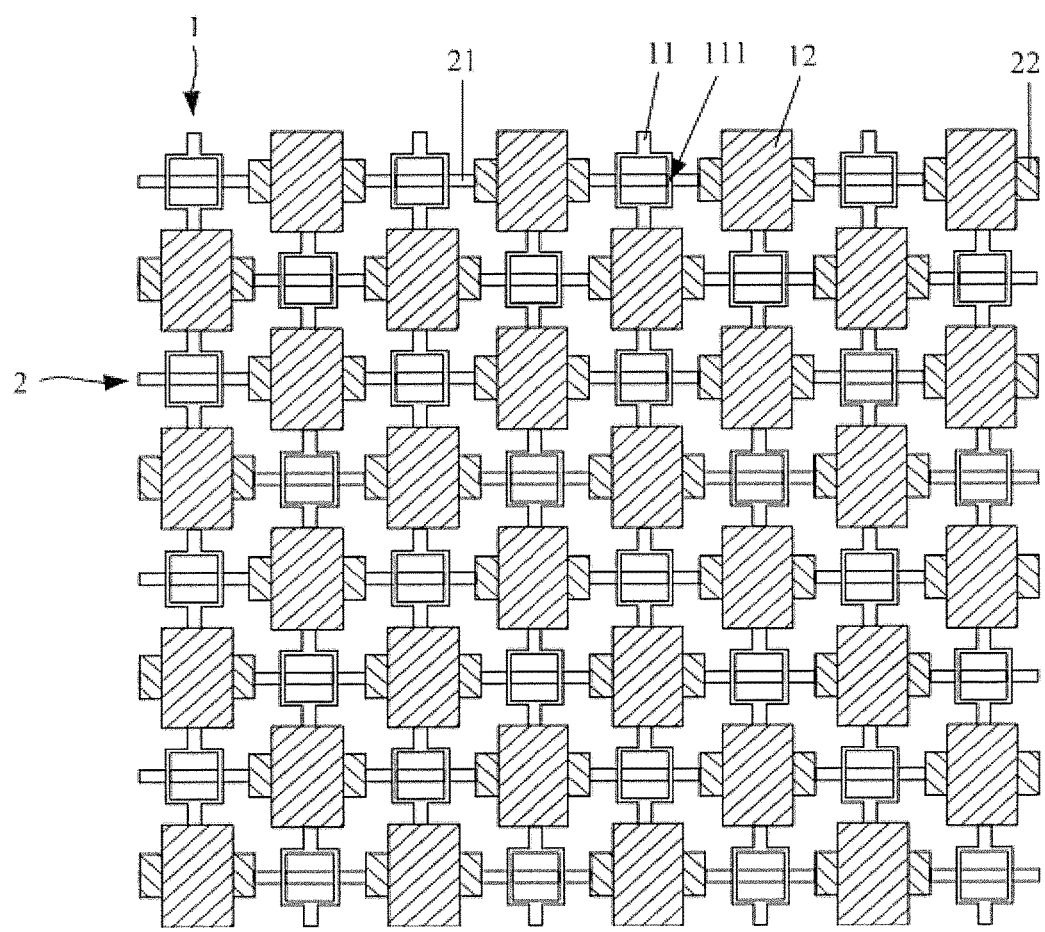
FIG. 5 is a diagram illustrating the structure of a touch substrate in some embodiments according to the present disclosure.

FIG. 5 is a diagram illustrating the structure of a touch substrate in some embodiments according to the present disclosure. Referring to FIG. 5, the metal electrode segment 11 in the second touch electrode layer 1 includes a closed ring-shaped electrode portion 111. As discussed above, this design increases the fringe capacitance between first touch electrode and the second touch electrode, and touch detection sensitivity in the touch panel. Optionally, all metal electrode segments 11 in the second touch electrode layer 1 include a closed ring-shaped electrode portion 111.

Figure 10:
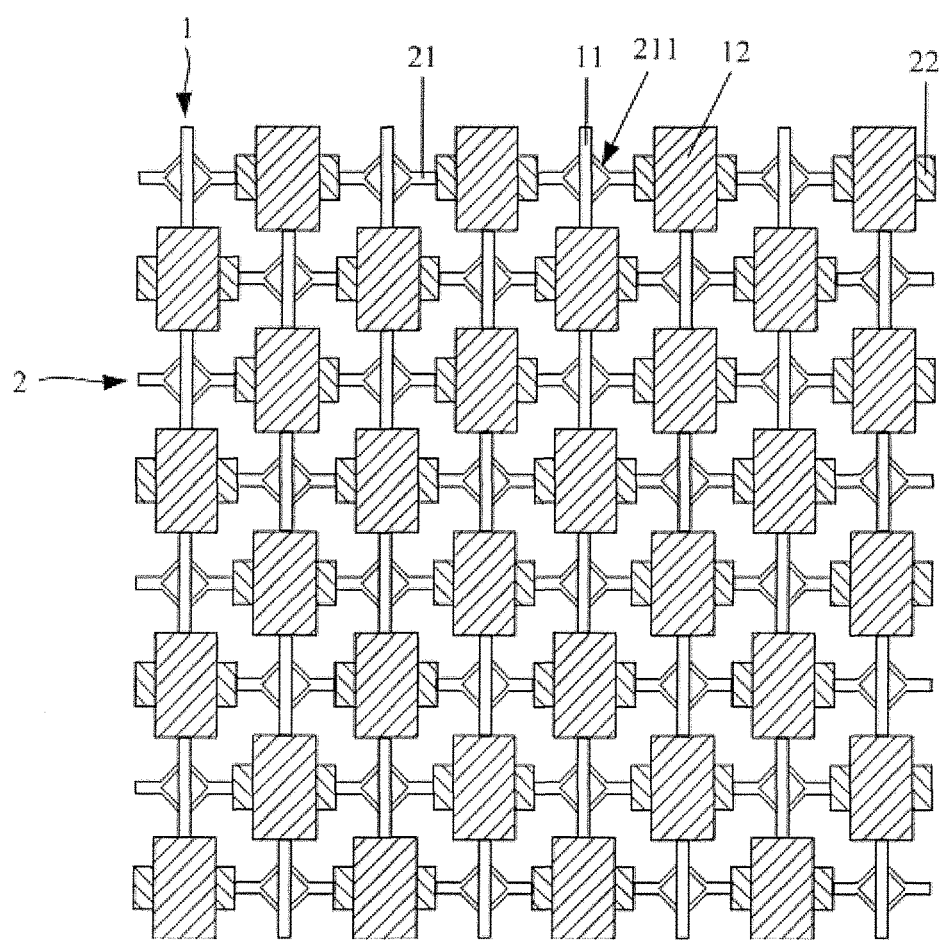
FIG. 10 is a diagram illustrating the structure of a touch substrate in some embodiments according to the present disclosure.

FIG. 10 is a diagram illustrating the structure of a touch substrate in some embodiments according to the present disclosure. Referring to FIG. 10, the metal electrode segment 21 in the first touch electrode layer 2 includes a closed ring-shaped electrode portion 211. This design increases the fringe capacitance between first touch electrode and the second touch electrode, and touch detection sensitivity in the touch panel. Optionally, all metal electrode segments 21 in the first touch electrode layer 2 include a closed ring-shaped electrode portion 211.

Optionally, the plurality of metal electrode segments 21 in the first touch electrode layer 2 correspond to the plurality of metal electrode segments 11 in the second touch electrode layer 1, e.g., in a one-to-one relationship. Optionally, projections of each pair of corresponding metal electrode segment 21 and metal electrode segment 11 on the base substrate partially overlap with each other.

In some embodiment, all metal electrode segments 21 in the first touch electrode layer 2 include a closed ring-shaped electrode portion 211, and all metal electrode segments 11 in the second touch electrode layer 1 include a closed ring-shaped electrode portion 111. The plurality of metal electrode segments 21 in the first touch electrode layer 2 correspond to the plurality of metal electrode segments 11 in the second touch electrode layer 1, each pair of corresponding metal electrode segment 21 and metal electrode segment 11 cross over each other, e.g., projections of each pair of corresponding metal electrode segment 21 and metal electrode segment 11 on the base substrate partially overlap with each other. Optionally, the projections on the base substrate of closed ring-shaped electrode portions of the pair of corresponding metal electrode segment 21 and metal electrode segment 11 that cross over each other are partially non-overlapping. Optionally, the projections on the base substrate of the pair of corresponding metal electrode segment 21 and metal electrode segment 11 cross over each other but minimally overlapping. For example, the shape and dimension of the pair of corresponding metal electrode segment 21 and metal electrode segment 11 may be designed such that projections of the two overlap with other as little as possible. In one example, the widths of the two corresponding metal electrode segments along the row direction are different so that projections on the base substrate of two sides of the ring-shape portion of the metal electrode segment 21 along the column direction do not overlap with those of the metal electrode segment 11. In another example, the lengths of the two corresponding metal electrode segments along the column direction are different so that projections on the base substrate of two sides of the ring-shape portion of the metal electrode segment 21 along the row direction do not overlap with those of the metal electrode segment 11. Optionally, the widths of the two corresponding metal electrode segments along the row direction are different so that projections on the base substrate of two sides of the ring-shape portion of the metal electrode segment 21 along the column direction do not overlap with those of the metal electrode segment 11; and the lengths of the two corresponding metal electrode segments along the column direction are different so that projections on the base substrate of two sides of the ring-shape portion of the metal electrode segment 21 along the row direction do not overlap with those of the metal electrode segment 11. By having this design, the fringe capacitance between the first touch electrode layer and the second touch electrode layer may be increased to the greatest extent.

Moreover, the non-metal transparent electrode segments in the first touch electrode layer and the second touch electrode layer correspond to each other. The areas corresponding to the overlapping pairs of non-metal transparent electrode segments have a high light transmittance rate, achieving an excellent blanking effect in the touch panel.

In some embodiments, a plurality of metal electrode segments in the first touch electrode layer correspond to a plurality of non-metal transparent electrode segments in the second touch electrode layer, and each pair of corresponding metal electrode segment in the first touch electrode layer and non-metal transparent electrode segments in the second touch electrode layer cross over each other, e.g., projections on the base substrate of each pair of electrode segments partially overlap with each other. Optionally, the metal electrode segments in the first touch electrode layer include a closed ring-shaped electrode portion. Similarly, in some embodiments, a plurality of metal electrode segments in the second touch electrode layer correspond to a plurality of non-metal transparent electrode segments in the first touch electrode layer, and each pair of corresponding metal electrode segment in the second touch electrode layer and non-metal transparent electrode segments in the first touch electrode layer cross over each other, e.g., projections on the base substrate of each pair of electrode segments partially overlap with each other. Optionally, the metal electrode segments in the second touch electrode layer include a closed ring-shaped electrode portion.

By having some or all metal electrode segments including a closed ring-shaped electrode portion, the fringe capacitance between first touch electrode layer and the second touch electrode layer, and consequentially, touch detection sensitivity in the touch panel, may be greatly increased.

Figure 6:
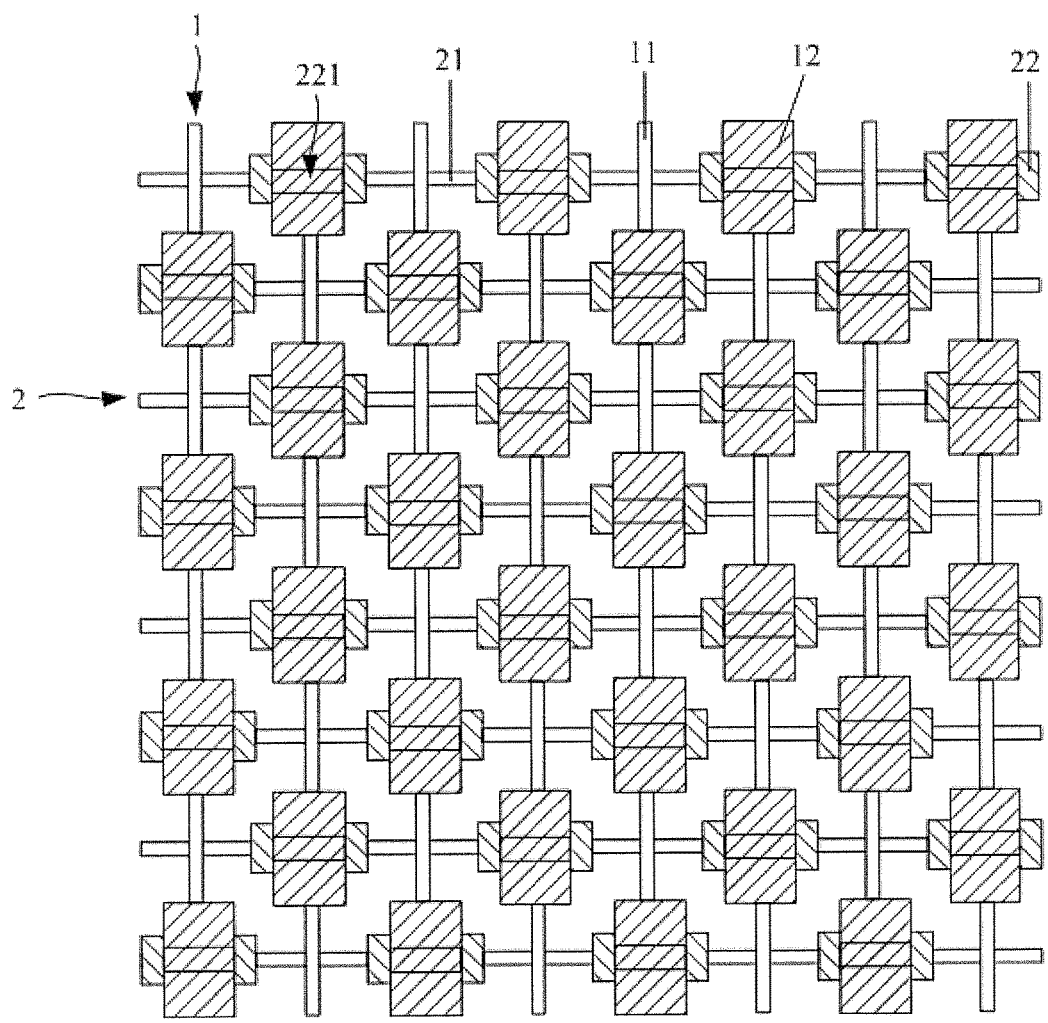
FIG. 6 is a diagram illustrating the structure of a touch substrate in some embodiments according to the present disclosure.
Figure 7:
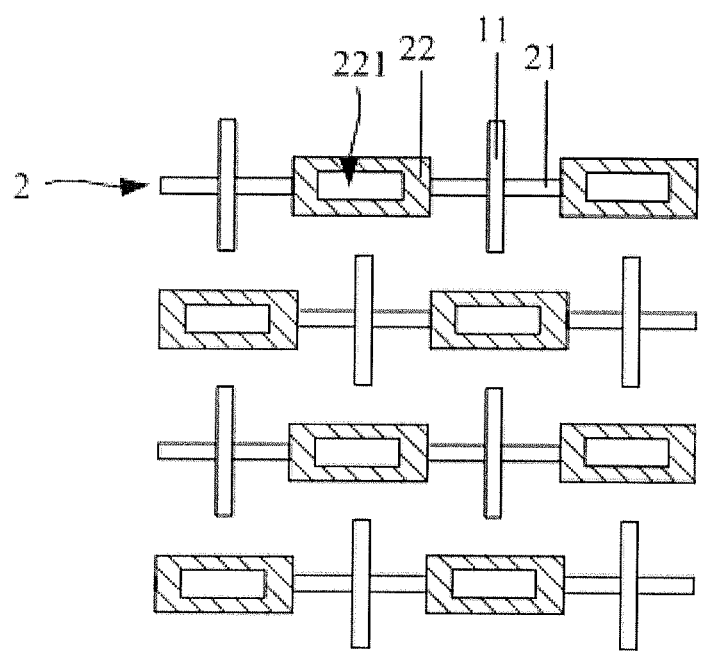
FIG. 7 is a zoom-in view of a touch substrate in some embodiments according to the present disclosure.

In some embodiments, some or all of the non-metal transparent electrode segments in one or both touch electrode layers include a closed ring-shaped electrode portion. FIG. 6 is a diagram illustrating the structure of a touch substrate in some embodiments according to the present disclosure. FIG. 7 is a zoom-in view of a touch substrate in some embodiments according to the present disclosure. Referring to FIG. 6 and FIG. 7, the non-metal transparent electrode segment 22 in the first touch electrode layer 2 includes a closed ring-shaped electrode portion 221. As discussed above, this design increases the fringe capacitance between first touch electrode and the second touch electrode, and touch detection sensitivity in the touch panel. Optionally, all non-metal transparent electrode segments 22 in the first touch electrode layer 2 include a closed ring-shaped electrode portion 221.

Figure 9:
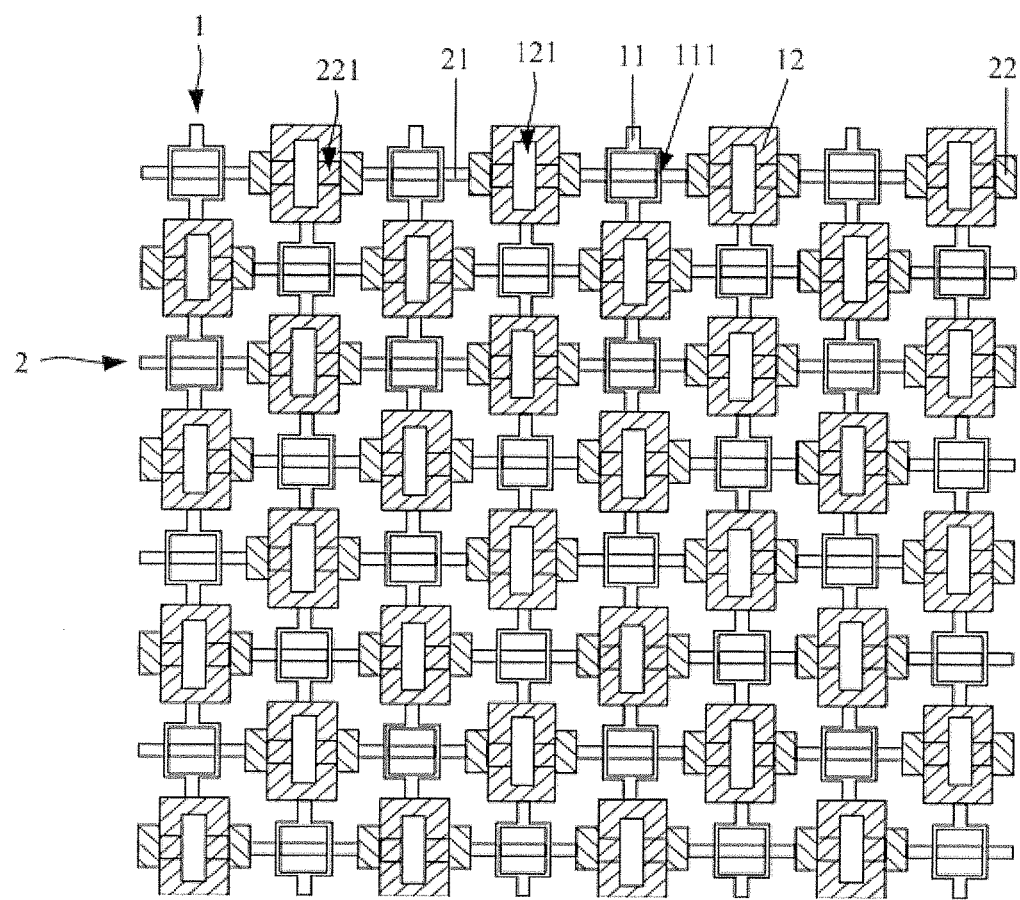
FIG. 9 is a diagram illustrating the structure of a touch substrate in some embodiments according to the present disclosure.

FIG. 9 is a diagram illustrating the structure of a touch substrate in some embodiments according to the present disclosure. Referring to FIG. 9, the non-metal transparent electrode segment 12 in the second touch electrode layer 1 includes a closed ring-shaped electrode portion 121. As discussed above, this design increases the fringe capacitance between first touch electrode and the second touch electrode, and touch detection sensitivity in the touch panel. Optionally, all non-metal transparent electrode segments 12 in the second touch electrode layer 1 include a closed ring-shaped electrode portion 121.

Optionally, the plurality of non-metal transparent electrode segments 22 in the first touch electrode layer 2 correspond to the plurality of non-metal transparent electrode segments 12 in the second touch electrode layer 1, e.g., in a one-to-one relationship. Optionally, projections of each pair of corresponding non-metal transparent electrode segment 22 and non-metal transparent electrode segment 12 on the base substrate partially overlap with each other.

In some embodiment, all non-metal transparent electrode segments 22 in the first touch electrode layer 2 include a closed ring-shaped electrode portion 221, and all non-metal transparent electrode segments 12 in the second touch electrode layer 1 include a closed ring-shaped electrode portion 111. The plurality of non-metal transparent electrode segments 22 in the first touch electrode layer 2 correspond to the plurality of non-metal transparent electrode segments 12 in the second touch electrode layer 1, each pair of corresponding non-metal transparent electrode segment 22 and non-metal transparent electrode segment 12 cross over each other, e.g., projections of each pair of corresponding non-metal transparent electrode segment 22 and non-metal transparent electrode segment 12 on the base substrate partially overlap with each other. Optionally, the projections on the base substrate of closed ring-shaped electrode portions of the pair of corresponding non-metal transparent electrode segment 22 and non-metal transparent electrode segment 12 that cross over each other are partially non-overlapping. Optionally, the projections on the base substrate of the pair of corresponding non-metal transparent electrode segment 22 and non-metal transparent electrode segment 12 cross over each other but minimally overlapping. For example, the shape and dimension of the pair of corresponding non-metal transparent electrode segment 22 and non-metal transparent electrode segment 12 may be designed such that projections of the two overlap with other as little as possible. In one example, the widths of the two corresponding non-metal transparent electrode segments along the row direction are different so that projections on the base substrate of two sides of the ring-shape portion of the non-metal transparent electrode segment 22 along the column direction do not overlap with those of the non-metal transparent electrode segment 12. In another example, the lengths of the two corresponding metal electrode segments along the column direction are different so that projections on the base substrate of two sides of the ring-shape portion of the non-metal transparent electrode segment 22 along the row direction do not overlap with those of the non-metal transparent electrode segment 12. Optionally, the widths of the two corresponding non-metal transparent electrode segments along the row direction are different so that projections on the base substrate of two sides of the ring-shape portion of the non-metal transparent electrode segment 22 along the column direction do not overlap with those of the non-metal transparent electrode segment 12; and the lengths of the two corresponding metal electrode segments along the column direction are different so that projections on the base substrate of two sides of the ring-shape portion of the non-metal transparent electrode segment 22 along the row direction do not overlap with those of the non-metal transparent electrode segment 12. By having this design, the fringe capacitance between the first touch electrode layer and the second touch electrode layer may be increased to the greatest extent.

Because the non-metal transparent electrode segments in the first touch electrode layer and the second touch electrode layer correspond to each other, the areas corresponding to the overlapping pairs of non-metal transparent electrode segments have a high light transmittance rate. An excellent blanking effect may be achieved in the touch panel.

In some embodiments, a plurality of metal electrode segments in the first touch electrode layer correspond to a plurality of non-metal transparent electrode segments in the second touch electrode layer, and each pair of corresponding metal electrode segment in the first touch electrode layer and non-metal transparent electrode segments in the second touch electrode layer cross over each other, e.g., projections on the base substrate of each pair of electrode segments partially overlap with each other. Optionally, the non-metal transparent electrode segments in the second touch electrode layer include a closed ring-shaped electrode portion. Similarly, in some embodiments, a plurality of metal electrode segments in the second touch electrode layer correspond to a plurality of non-metal transparent electrode segments in the first touch electrode layer, and each pair of corresponding metal electrode segment in the second touch electrode layer and non-metal transparent electrode segments in the first touch electrode layer cross over each other, e.g., projections on the base substrate of each pair of electrode segments partially overlap with each other. Optionally, the non-metal transparent electrode segments in the first touch electrode layer include a closed ring-shaped electrode portion.

By having some or all non-metal transparent electrode segments including a closed ring-shaped electrode portion, the fringe capacitance between first touch electrode layer and the second touch electrode layer, and consequentially, touch detection sensitivity in the touch panel, may be greatly increased.

Figure 8:
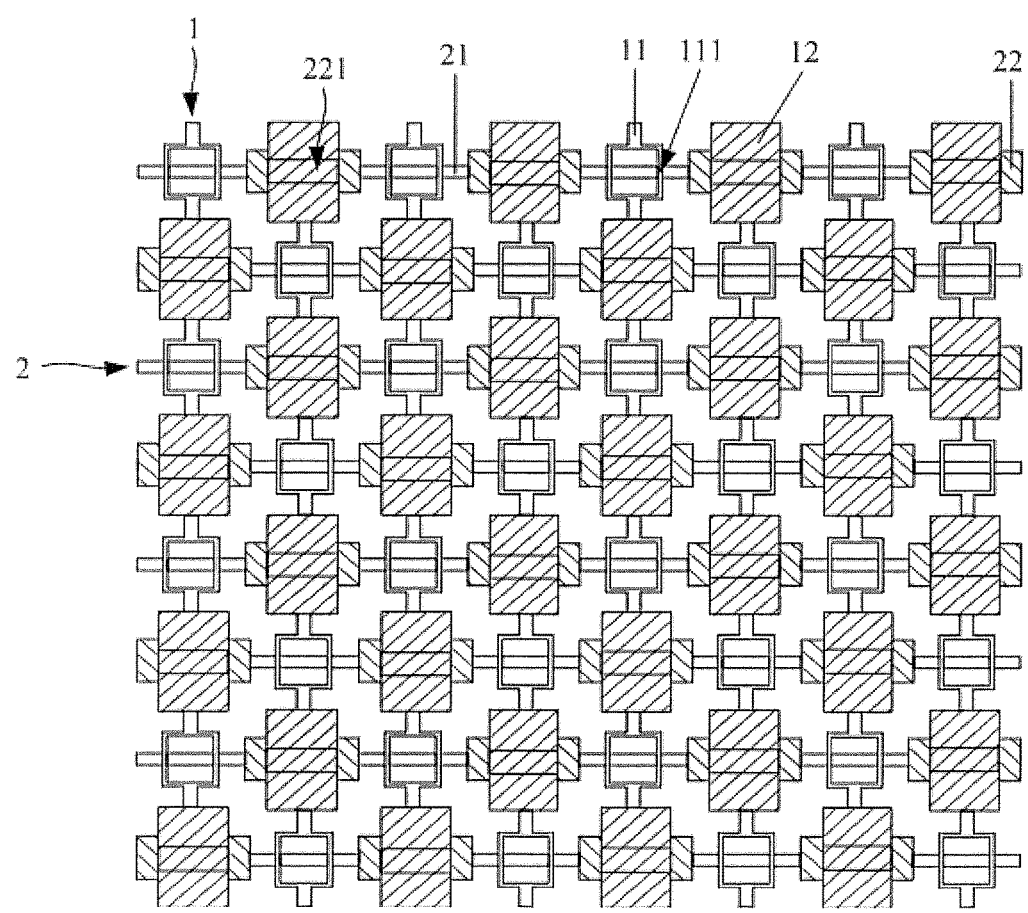
FIG. 8 is a diagram illustrating the structure of a touch substrate in some embodiments according to the present disclosure.

In some embodiments, the metal electrode segments in one touch electrode layer and the non-metal transparent electrode segments in another touch electrode layer include a closed ring-shaped electrode portion. FIG. 8 is a diagram illustrating the structure of a touch substrate in some embodiments according to the present disclosure. Referring to FIG. 8, the metal electrode segments 11 in the second touch electrode layer 1 includes a closed ring-shaped electrode portion 111, and the non-metal transparent electrode segments 22 in the first touch electrode layer 2 includes a closed ring-shaped electrode portion 221.

In some embodiments, the metal electrode segments and the non-metal transparent electrode segments in a same touch electrode layer include a closed ring-shaped electrode portion. Optionally, some or more non-metal transparent electrode segments in a different touch electrode layer also include a closed ring-shaped electrode portion. Referring to FIG. 9, the metal electrode segments 11 in the second touch electrode layer 1 includes a closed ring-shaped electrode portion 111, the non-metal transparent electrode segments 12 in the second touch electrode layer 1 includes a closed ring-shaped electrode portion 121, and the non-metal transparent electrode segments 22 in the first touch electrode layer 2 includes a closed ring-shaped electrode portion 221. Projections on the base substrate of closed ring-shaped electrode portions of the pair of corresponding non-metal transparent electrode segment 22 and non-metal transparent electrode segment 12 that cross over each other are partially non-overlapping, further increasing the fringe capacitance between the first touch electrode layer 2 and the second touch electrode layer 1.

Optionally, some or all metal electrode segments in one or both of the first touch electrode layer and the second touch electrode layer include a closed ring-shaped electrode portion; and some or all non-metal transparent electrode segments in one or both of the first touch electrode layer and the second touch electrode layer include a closed ring-shaped electrode portion.

Optionally, the metal electrode segments in the first touch electrode layer correspond to the metal electrode segments in the second touch electrode layer, and the non-metal transparent electrode segments in the first touch electrode layer correspond to the non-metal transparent electrode segments in the second touch electrode layer. By having this design, the areas corresponding to the overlapping pairs of non-metal transparent electrode segments have a high light transmittance rate, achieving an excellent blanking effect in the touch panel.

In another aspect, the present disclosure provides a method of fabricating a touch substrate. In some embodiments, the method includes forming a first touch electrode layer including a plurality of rows of first touch electrodes; and forming a second touch electrode layer including a plurality of columns of second touch electrode. Each of the plurality of rows is formed to include a plurality of first electrode segments spaced apart from each other and a plurality of second electrode segments spaced apart from each other. Each of the plurality of columns is formed to include a plurality of third electrode segments spaced apart from each other and a plurality of fourth electrode segments spaced apart from each other.

In some touch substrates fabricated by the present method, the plurality of metal electrode segments in the first touch electrode layer cross over the plurality of metal electrode segments in the second touch electrode layer, forming an irregular metal electrode pattern. The irregular metal pattern in the touch substrate fabricated by the present method prevents the occurrence of Moiré pattern due to the presence of the metal lines in the touch panel. Accordingly, the metal electrode line in the present touch substrate may be fabricated to have a relatively large width, resulting in a lower touch electrode resistance and a higher signal transmittance rate. Moreover, the inclusion of non-metal transparent electrode segments enhances overall light transmittance of the touch panel, achieving an excellent blanking effect.

In some embodiments, the step of forming the first touch electrode layer includes forming a metal electrode material layer on a base substrate; patterning the metal electrode material layer to form a plurality of rows of metal electrode segments; forming a non-metal transparent electrode material layer on the base substrate; and patterning the non-metal transparent electrode material layer to form a plurality of rows of non-metal transparent electrode segments. The first touch electrode layer is formed so that adjacent metal electrode segments along a row direction are electrically connected through a non-metal transparent electrode segment; and adjacent non-metal transparent electrode segments along a row direction are electrically connected through a metal electrode segment.

In some embodiments, the method further includes forming an insulating layer on a side of the first touch electrode layer distal to the base substrate; and forming the second touch electrode layer on a side of the insulating layer distal to the first touch electrode layer.

In some embodiments, the step of forming the second touch electrode layer comprises forming a metal electrode material layer on the insulating layer; patterning the metal electrode material layer to form a plurality of columns of metal electrode segments; forming a non-metal transparent electrode material layer on the insulating layer; and patterning the non-metal transparent electrode material layer to form a plurality of columns of non-metal transparent electrode segments. The second touch electrode layer is formed so that adjacent metal electrode segments along a column direction are electrically connected through a non-metal transparent electrode segment; and adjacent non-metal transparent electrode segments along a column direction are electrically connected through a metal electrode segment.

In some embodiments, the plurality of first electrode segments and the plurality of second electrode segments are formed on a same horizontal plane; and the plurality of third electrode segments and the plurality of fourth electrode segments are formed on a same horizontal plane. Optionally, the first touch electrode layer and the second touch electrode layer are formed in different layers.

In some embodiments, one of the first electrode segment and the second electrode segment is a non-metal transparent electrode segment and the other one of the first electrode segment and the second electrode segment is a metal electrode segment; and one of the third electrode segment and the fourth electrode segment is a non-metal transparent electrode segment and the other one of the third electrode segment and the fourth electrode segment is a metal electrode segment. Optionally, the plurality of first electrode segments and the plurality of third electrode segments are metal electrode segments; and the plurality of second electrode segments and the plurality of fourth electrode segments are non-metal transparent electrode segments. Optionally, the plurality of first electrode segments and the plurality of fourth electrode segments are metal electrode segments; and the plurality of second electrode segments and the plurality of third electrode segments are non-metal transparent electrode segments.

Various appropriate metal electrode materials and various appropriate fabricating methods may be used to make the metal electrode segment. For example, a metal electrode material may be deposited on the substrate by a plasma-enhanced chemical vapor deposition (PECVD) process. Examples of appropriate metal electrode materials include, but are not limited to, a metal material and a graphene electrode material. Examples of appropriate metal electrode materials include, but are not limited to, copper, aluminum, silver, molybdenum, chromium, neodymium, nickel, manganese, titanium, tantalum, and tungsten.

Various appropriate non-metal transparent electrode materials and various appropriate fabricating methods may be used to make the non-metal transparent electrode segment. For example, a non-metal transparent electrode material may be deposited on the substrate by a plasma-enhanced chemical vapor deposition (PECVD) process. Examples of appropriate metal electrode materials include, but are not limited to, various transparent metal oxide electrode materials and transparent nano-carbon tubes. Examples of transparent metal oxide materials include, but are not limited to, indium tin oxide, indium zinc oxide, indium gallium oxide, and indium gallium zinc oxide.

Various appropriate insulating materials and various appropriate fabricating methods may be used to make the insulating layer. For example, an insulating material may be deposited on the substrate by a plasma-enhanced chemical vapor deposition (PECVD) process. Examples of appropriate insulating materials include, but are not limited to, polyimide, silicon oxide ($SiO_y$), silicon nitride ($SiN_y$, e.g., $Si_3N_4$), and silicon oxynitride ($SiO_xN_y$).

In some embodiments, one or more of the first electrode segment, the second electrode segment, the third electrode segment, and the fourth electrode segment is formed to include a closed ring-shaped electrode portion (e.g., an electrode segment having an opening in a central portion thereof). Optionally, the plurality of first electrode segments and the plurality of third electrode segments are metal electrode segments; the plurality of second electrode segments and the plurality of fourth electrode segments are non-metal transparent electrode segments; and one or both of the first electrode segment and the third electrode segment is formed to have a closed ring-shaped electrode portion. Optionally, both the first electrode segment and the third electrode segment are formed to have a closed ring-shaped electrode portion; and projections on the touch substrate of closed ring-shaped electrode portions of a pair of first electrode segment and third electrode segment that cross over each other are partially non-overlapping. Optionally, the plurality of first electrode segments and the plurality of fourth electrode segments are metal electrode segments; the plurality of second electrode segments and the plurality of third electrode segments are non-metal transparent electrode segments; and the first electrode segment and the fourth electrode segment are formed to have a closed ring-shaped electrode portion. Optionally, the second electrode segment and the third electrode are formed to have a closed ring-shaped electrode portion. Optionally, the plurality of first electrode segments and the plurality of third electrode segments are metal electrode segments; the plurality of second electrode segments and the plurality of fourth electrode segments are non-metal transparent electrode segments; and one or both of the second electrode segment and the fourth electrode segment are formed to have a closed ring-shaped electrode portion. Optionally, both the second electrode segment and the fourth electrode segment are formed to have a closed ring-shaped electrode portion; and projections on the touch substrate of closed ring-shaped electrode portions of a pair of second electrode segment and fourth electrode segment that cross over each other are partially non-overlapping.

In another aspect, the present disclosure provides a touch display panel having a touch substrate described herein or fabricated by a method described herein.

In another aspect, the present disclosure provides a touch display apparatus having a touch display panel described herein. Examples of appropriate touch display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising:
a first touch electrode layer comprising a plurality of rows of first touch electrodes; each of the plurality of rows of first touch electrodes comprising a plurality of first electrode segments spaced apart from each other and a plurality of second electrode segments spaced apart from each other; and
a second touch electrode layer comprising a plurality of columns of second touch electrodes; each of the plurality of columns of second touch electrodes comprising a plurality of third electrode segments spaced apart from each other and a plurality of fourth electrode segments spaced apart from each other;
wherein each of the plurality of rows of first touch electrodes comprises a plurality of metal electrode segments and a plurality of non-metal transparent electrode segments alternately arranged;
each of the plurality of columns of second touch electrodes comprises a plurality of metal electrode segments and a plurality of non-metal transparent electrode segments alternately arranged;
adjacent first electrode segments of the plurality of first electrode segments along a row direction are electrically connected through, and respectively directly connected to, a second electrode segment of the plurality of second electrode segments; adjacent second electrode segments of the plurality of second electrode segments along a row direction are electrically connected through, and respectively directly connected to, a first electrode segment of the plurality of first electrode segments; adjacent third electrode segments of the plurality of third electrode segments along a column direction are electrically connected through, and respectively directly connected to, a fourth electrode segment of the plurality of fourth electrode segments; and adjacent fourth electrode segments of the plurality of fourth electrode segments along a column direction are electrically connected through, and respectively directly connected to, a third electrode segment of the plurality of third electrode segments;
the plurality of first electrode segments respectively crossing over the plurality of third electrode segments thereby forming a plurality of first intersections;
the plurality of second electrode segments respectively crossing over the plurality of fourth electrode segments thereby forming a plurality of second intersections; and
each of the plurality of second electrode segments and the plurality of fourth electrode segments has a surface area greater than a surface area of each of the plurality of first electrode segments and the plurality of third electrode segments.

2. The touch substrate of claim 1, wherein the plurality of first electrode segments and the plurality of third electrode segments are metal electrode segments; and the plurality of second electrode segments and the plurality of fourth electrode segments are non-metal transparent electrode segments.

3. The touch substrate of claim 1, wherein the plurality of first electrode segments and the plurality of fourth electrode segments are metal electrode segments; and the plurality of second electrode segments and the plurality of third electrode segments are non-metal transparent electrode segments.

4. The touch substrate of claim 1, wherein one or more of the plurality of first electrode segments, the plurality of second electrode segments, the plurality of third electrode segments, and the plurality of fourth electrode segments comprises a closed ring-shaped electrode portion.

5. The touch substrate of claim 4, wherein one or both of the plurality of first electrode segments and the plurality of third electrode segments comprises a closed ring-shaped electrode portion; and
the plurality of first electrode segments and the plurality of third electrode segments are metal electrode segments; and the plurality of second electrode segments and the plurality of fourth electrode segments are non-metal transparent electrode segments.

6. The touch substrate of claim 5, wherein both the plurality of first electrode segments and the plurality of third electrode segments comprise a closed ring-shaped electrode portion; and
projections on the touch substrate of closed ring-shaped electrode portions of a pair of first electrode segment and third electrode segment that cross over each other are partially non-overlapping.

7. The touch substrate of claim 4, wherein each of the plurality of first electrode segments and the plurality of fourth electrode segments comprise a closed ring-shaped electrode portion; and
the plurality of first electrode segments and the plurality of fourth electrode segments are metal electrode segments; and the plurality of second electrode segments and the plurality of third electrode segments are non-metal transparent electrode segments.

8. The touch substrate of claim 7, wherein each of the plurality of second electrode segments and the plurality of third electrode segments comprise a closed ring-shaped electrode portion.

9. The touch substrate of claim 4, wherein one or both of the plurality of second electrode segments and the plurality of fourth electrode segments comprises a closed ring-shaped electrode portion; and
the plurality of first electrode segments and the plurality of third electrode segments are metal electrode segments; and the plurality of second electrode segments and the plurality of fourth electrode segments are non-metal transparent electrode segments.

10. The touch substrate of claim 9, wherein both the plurality of second electrode segments and the plurality of fourth electrode segments comprise a closed ring-shaped electrode portion; and
projections on the touch substrate of closed ring-shaped electrode portions of a pair of second electrode segment and fourth electrode segment that cross over each other are partially non-overlapping.

11. The touch substrate of claim 1, comprising a bases substrate;
the first touch electrode layer on the base substrate;
an insulating layer on a side of the first touch electrode layer distal to the base substrate; and
the second touch electrode layer.

12. The touch substrate of claim 1, wherein the plurality of non-metal transparent electrode segments are made of a transparent metal oxide.

13. A touch panel, comprising a touch substrate of claim 1.

14. A display apparatus, comprising a touch panel of claim 13.

15. A method of fabricating a touch substrate, comprising:
forming a first touch electrode layer comprising a plurality of rows of first touch electrodes; each of the plurality of rows of first touch electrodes being formed to comprise a plurality of first electrode segments spaced apart from each other and a plurality of second electrode segments spaced apart from each other; and forming a second touch electrode layer comprising a plurality of columns of second touch electrodes; each of the plurality of columns of second touch electrodes being formed to comprise a plurality of third electrode segments spaced apart from each other and a plurality of fourth electrode segments spaced apart from each other;

wherein each of the plurality of rows of first touch electrodes is formed to comprise a plurality of metal electrode segments and a plurality of non-metal transparent electrode segments alternately arranged;

each of the plurality of columns of second touch electrodes is formed to comprise a plurality of metal electrode segments and a plurality of non-metal transparent electrode segments alternately arranged;

adjacent first electrode segments of the plurality of first electrode segments along a row direction are electrically connected through, and respectively directly connected to, a second electrode segment of the plurality of second electrode segments; adjacent second electrode segments of the plurality of second electrode segments along a row direction are electrically connected through, and respectively directly connected to, a first electrode segment of the plurality of first electrode segments; adjacent third electrode segments of the plurality of third electrode segments along a column direction are electrically connected through, and respectively directly connected to, a fourth electrode segment of the plurality of fourth electrode segments; and adjacent fourth electrode segments of the plurality of fourth electrode segments along a column direction are electrically connected through, and respectively directly connected to, a third electrode segment of the plurality of third electrode segments;

the plurality of first electrode segments respectively crossing over the plurality of third electrode segments thereby forming a plurality of first intersections;

the plurality of second electrode segments respectively crossing over the plurality of fourth electrode segments thereby forming a plurality of second intersections; and each of the plurality of second electrode segments and the plurality of fourth electrode segments has a surface area greater than a surface area of each of the plurality of first electrode segments and the plurality of third electrode segments.

16. The method of claim 15, wherein the step of forming the first touch electrode layer comprises forming a metal electrode material layer on a base substrate; patterning the metal electrode material layer to form a plurality of rows of metal electrode segments; and forming a non-metal transparent electrode material layer on the base substrate; patterning the non-metal transparent electrode material layer to form a plurality of rows of non-metal transparent electrode segments;

wherein adjacent metal electrode segments along a row direction are electrically connected through a non-metal transparent electrode segment; adjacent non-metal transparent electrode segments along a row direction are electrically connected through a metal electrode segment.

17. The method of claim 16, further comprising:

forming an insulating layer on a side of the first touch electrode layer distal to the base substrate; and forming the second touch electrode layer on a side of the insulating layer distal to the first touch electrode layer;

wherein the step of forming the second touch electrode layer comprises forming a metal electrode material layer on the insulating layer; patterning the metal electrode material layer to form a plurality of columns of metal electrode segments; and forming a non-metal transparent electrode material layer on the insulating layer; patterning the non-metal transparent electrode material layer to form a plurality of columns of non-metal transparent electrode segments;

wherein adjacent metal electrode segments along a column direction are electrically connected through a non-metal transparent electrode segment; adjacent non-metal transparent electrode segments along a column direction are electrically connected through a metal electrode segment.

* * * * *